United States Patent Office 3,505,074
Patented Apr. 7, 1970

3,505,074
PHOSPHATIDES AND THEIR METHOD FOR THEIR PREPARATION
Hermann Pardun, Kleve, Germany, assignor to Lever Brothers Company, New York, N.Y., a corporation of Maine
No Drawing. Filed Apr. 16, 1968, Ser. No. 721,567
Claims priority, application Germany, Apr. 18, 1967, U 13,785
Int. Cl. A23j 7/01
U.S. Cl. 99—15                15 Claims

ABSTRACT OF THE DISCLOSURE

A process for the preparation of plant phosphatides which can be used both in oil-in-water emulsions and in water-in-oil emulsions and which do not lose their emulsifying power in the presence of calcium and/or magnesium ions, in which an aqueous emulsion of an unhydrolysed plant phosphatide at a pH between 2 and 12 is hydrolysed between 50° and 100° C. and the phosphatide is separated from the aqueous medium when its hard water half-value time for emulsification of oil is at least 0.2 hour.

---

This invention relates to a process for the preparation of partially hydrolyzed plant phosphatides.

The plant phosphatides obtained as by-products in the production of vegetable oils and usually known under such names as soya, groundnut and rapeseed lecithins, consist of about 65% of an acetone-insoluble mixture of phosphatides, sugars and glycolipids, and 35% of acetone-soluble substances, mainly neutral glyceride oil, free fatty acids and unsaponifiable materials. The phosphatide mixture itself consists of one third each of its weight of phosphatidyl choline, of the group of cephalin phosphatides and of the group of inositol phosphatides.

Plant phosphatide mixtures, especially soya lecithin, are applied industrially as emulsifiers in the preparation of fat-containing feeding stuffs and foodstuffs. In general they are most useful in stabilizing water-in-oil emulsions, and are less active in oil-in-water emulsions.

A difficulty frequently encountered in the use of such phosphatides as emulsifying agents is the fact that they are very sensitive to calcium and magnesium ions. Thus, in the in situ preparation of artificial calf-milk in farm houses very often water of rather poor quality is used and in general it contains calcium and/or magnesium salts. As a result the product obtained, which is an oil-in-water emulsion, is only stable for a very short time. An example of a water-in-oil emulsion, the stability of which may be impaired by calcium ions, is margarine in which soured skim milk is used as the aqueous phase. In this instance the poor stability of the emulsion is shown by heavy spattering when the margarine is used for frying purposes.

The emulsifying powers of phosphatides can be determined by the following test:

50 ml. of water of 50° C. and a solution of 1 g. of the phosphatide under test in 9 g. of soft groundnut fat of melting point 32° C. are placed in a mixing cylinder of 100 ml. capacity (internal diameter 25 mm.; height 280 mm.) and a coarse emulsion is prepared by rotating the cylinder along its cross axis through 180° twenty times, each rotation taking one second. The cylinder is then placed in a water bath maintained at 50° C. and the time required for separation of 25 ml. of water is noted. This time is a measure for the stability of the emulsion and in this specification it is referred to as the half-value time for emulsification of oil, and where the water used is of 13° hardness, as the hard water half-value time.

It has now been found that plant phosphatides can be prepared which can be used both in oil-in-water and in water-in-oil emulsions and which do not lose their emulsifying power in the presence of calcium and/or magnesium ions, by a process in which an aqueous emulsion of an unhydrolyzed plant phosphatide at a pH of between 2 and 12 is hydrolyzed between 50° and 100° C. and the phosphatide is separated from the aqueous medium when its hard water half-value time for emulsification of oil, as hereinbefore, defined, is at least 0.2 hour.

Normally such products are used as a starting materials in the above process in which the phosphatide fraction consists mainly of unhydrolyzed phosphatides, although unhydrolyzed phosphatides can also be used in admixture with already partially hydrolyzed phosphatides. When an aqueous emulsion of an essentially unhydrolyzed phosphatide is submitted to the process according to the invention, the hard water half-value time of the products gradually increases from about 1 minute or less to several hours. For practical purposes the only phosphatide products that are useful are those that have a hard water half-value time of at least 0.2 hour.

These improved emulsifying properties are due to a partial hydrolysis of the phosphatides, as is illustrated by the fact that the acid number of the water-free product increases considerably during the process. Too prolonged hydrolyses will ultimately result in complete destruction of the phosphatide and consequently in total loss of emulsifying properties, so that during theg process an optimum hard water half value time is reached, after which this half-value time decreases. Although this optimum is dependent on several factors, such as origin and quality of the phosphatide used, pH and temperature of the aqueous medium during hydrolysis, it has been found that in general this optimum will be about 10 hours. For this reason it is preferable to discontinue hydrolysis before or at the moment the separated product has this value.

Although in principle hydrolysis can be achieved at any desired pH value, too extreme values both in acid and in alkaline media must be avoided, as apparently in these conditions undesirable side reactions take place. For this reason only pH values of between 2 and 12 are acceptable.

The half-value time required for any particular product is dependent on the use to which the product is to be put, but it has been found that in most cases half-value times of between 1 and 5 hours are satisfactory.

For the preparation of general-purpose phosphatides hydrolysis therefore is continued for a period such that the half-value time of the resulting product is between 1 and 5 hours.

The heating time required will not only be dependent on the half-value time desired, but also on the quality of the starting material, the temperature and especially the pH of the emulsion. Thus, in a pH range between 2 and 5 a heating time of at least 4 hours, preferably between 4 and 10 hours, is required. In a pH range between 5 and 8 heating times between 10 and 24 hours are preferable. Finally in a pH range between 8 and 12 heating periods of 0.1 to 10 hours are preferable, with the provision that at a higher pH a shorter heating period will suffice.

Although the amount of water is not critical, the starting material is in general emulsified with about from 0.2 to 3 times, in particular 1 to 3 times its amount of water (based on its total phosphatide content), after which the pH of the emulsion is brought to the desired value.

In general treatment in media having a pH of 3 to 8 is preferable, since preparations are then obtained having a lighter colour than those obtained in media having a higher pH and the danger of extensive decomposition of the phosphatides is smaller. For the employment of the acid pH range dilute, at most 10%, aqueous solutions of inorganic and/or organic acids, such as hydrochloric, phosphoric, formic, acetic, lactic, tartaric, citric, gluconic and ascorbic acids or the organic sulphonic acids suitable as fat-splitting catalysts, for instance beta-naphthalenesulphonic, beta-camphorsulphonic, and toluene-p-sulphonic acids, can be added. For the introduction of the alkaline medium the addition of aqueous solutions of alkalis and/or salts of strong bases is recommended, such as alkalis with weak acids, for instance potassium carbonate, potassium bicarbonate, dipotassium hydrogen phosphate, sodium acetate. Only sufficient acid or alkali to introduce the desired pH value needs to be present.

For practical reasons the required heating time can be determined in a preliminary test by submitting a small portion of the starting material to hydrolysis for a certain period, e.g. up to 24 to 48 hours, taking samples from the reaction mixture at intervals and determining the half-value time. On the basis of the results thus obtained the main charge can then be treated for the desired period at the desired pH and the desired temperature. After hydrolysis is finished the pH of the reaction mixture is adjusted between 4 and 6, whereafter the reaction product is freed from water and other volatiles by evaporation under reduced pressure conveniently below 80° C.

Suitably one of the commercial crude plant lecithins, e.g. soya lecithin, can be used as starting material in the process according to the invention. Other suitable starting materials are hydrated plant phosphatides. By this is meant plant phosphatides obtained by treating with a small amount, preferably from 2 to 3%, of water a phosphatide-containing crude oil extracted from plants, so that the phosphatides become hydrated and are precipitated, and separating the precipitated phosphatides.

Finally the phosphatide fractions obtained by solvent fractionation or other processes from crude phosphatide mixtures containing plant oils and/or other substituents, such as free fatty acids, unsaponifiable materials, etc., can also be used as starting materials according to the invention.

A variant of the process suitable where especially light coloured phosphatide preparations are required and where the starting material used is a crude plant lecithin containing an acetone-insoluble mixture of phosphatides is hereinbefore described in admixture with sugars and other materials, is one in which the starting material is treated before the hydrolysis with such quantities of an acylating agent according to Belgian Patent No. 692,605, that the cephalin fraction is almost completely present as acylamino-cephalin. Obviously the discolouration due to the reaction of free sugars with the amino groups of the cephalin phosphatides in inhibited by this means.

Small quantities of hydrogen peroxide have previously been added to phosphatogen emulsions in order to produce a lighter colour in the phosphatides. Thus in the process according to the invention, for the purpose of bleaching the partially hydrolyzed phosphatide, from 1 to 5%, preferably 1 to 2% by weight of hydrogen peroxide can also be present.

The quality of the phosphatide product resulting after hydrolysis can also be improved by extracting the aqueous emulsion obtained by the hydrolysis with 1 to 3 times its volume of a suitable organic solvent and separating the phosphatide from the extract by centrifugation, thus removing for the greater part neutral oils, free fatty acids, coloured matter, etc. from the phosphatide. Suitable solvents for extraction are lower alkanols having from 1 to 4 carbon atoms, such as ethanol and isopropanol, lower alkanones having from 1 to 4 carbon atoms, such as acetone and 2-butanone, methyl acetate and ethyl acetate. On using these solvents two layers are obtained, a fatty acid-rich upper layer poor in phosphatides and a lower layer poor in neutral fat and fatty acids, which contains the phosphatide in enriched form.

Other organic solvents suitable for extraction of the aqueous hydrolysate are chlorinated hydrocarbons having 1 or 2 carbon atoms, such as methylene chloride, dichloroethylene and carbon tetrachloride. In these cases a lower layer is obtained which contains the neutral oil, free fatty acids and dark-coloured substances, together with an upper layer in which the active phosphatides are present in purified form.

A disadvantage of this purification is that the threshold value of the purified products when applied as emulsifiers in edible products, is slightly decreased. By this threshold value is meant the highest concentration of the product in foodstuffs which does not affect the taste of the food product adversely as assessed by conventional panel tests. This threshold value can be increased again by mixing the phosphatide obtained by the centrifugation with an amount of a purified vegetable glyceride oil such that the total phosphatide content of the resulting mixture is essentially the same as the phosphatide content of the mixture before extraction with the organic solvent.

The plant phosphatides modified by the process according to the invention possess an essentially improved emulsifying action both in oil-in-water and in water-in-oil systems in the sense that they do not lose their emulsifying power in the presence of calcium ions. This is rather surprising because it does not parallel stability in distilled water, e.g. on heating aqueous emulsions of crude phosphatides having a pH of about 4 very briefly until the emulsions break (for example after about 30 minutes at about 60° C.) the resulting products possess a very high half-value time in distilled water (from about 300 to 800 hours), but it is still very sensitive to calcium and/or magnesium ions. During submission of such a product to a further hydrolysis according to the invention, the half-value time in hard water gradually increases until an optimum is reached, as explained above, but the half-value time in distilled water first decreases rather steeply and later increases again at a later stage of the heating process, of course also reaching a certain optimum value. Apparently different factors are involved, the increase during the second stage of the process being due to hydrolysis.

The improved emulsifying action has nothing to do with the presence of free fatty acids formed during the hydrolysis process, since mixtures of the crude phosphatides with from 10 to 20% of oleic acid or linoleic acid do not give more stable emulsions in hard water than phosphatides to which such acid has not been added.

Furthermore it is not owing to a change in the choline-lecithin:cephalin ratio, as this remains substantially the same during the hydrolysis process.

The phosphatides produced by the process of the invention can be used with advantage as emulsifying agents in preparations where fats or oils are present in emulsified form, such as foodstuffs and feeding stuffs, for example mayonnaise, salad sauces and baking additives, and cosmetic and pharmaceutical preparations. They are particularly suitable as emulsifying agents in emulsions, both water-in-oil and oil-in-water emulsions, the water phase of which contains calcium and/or magnesium ions. An example of a water-in-oil emulsion in which the phosphatides produced by the process of the invention can be used advantageously is margarine. Examples of oil-in-water emulsions in which the phosphatides produced by the process of the invention can be used advantageously are artificial calf-milks, by which is meant emulsions prepared by mixing 80 parts of water with 10 to 25 parts of a pre-mix containing from 10 to 25% of fat plus emulsifier, from 70 to 85% by weight of skim milk powder and/or whey powder and made up to 100% with one or more of the following ingredients: sugar, vitamins, antibiotics, starch and minerals.

The invention is illustrated by the following examples, where the half-value times given in the examples were determined by the test described above and other analytical data were obtained by conventional methods.

EXAMPLE 1

525 g. soya lecithin slime with a content of 300 g. crude phosphatide (acid number 19.3; 67.3% acetone-insoluble fraction, 19.9% choline lecithin, 14.7% cephalin), were heated with 775 g. water and 3.5 g. citric acid for about 0.5 hour at 60° C. The mixture, which had a pH value of 4.0, was then separated into two layers by centrifugation and the water layer (450 ml.) containing as well as the citric acid 20 g. of water-soluble lecithin components, was discarded. The phosphatide-rich layer was emulsified with 400 ml. of water and after readjustment of the pH to 4 by addition of some citric acid, the emulsion was heated for 4 hours at 95° C. with occasional stirring. After cooling, most of the water layer was removed by centrifugation and the phosphatide-containing upper phase was evaporated in a vacuum rotary evaporator at temperatures below 80° C. to yield an oily residue of a hard water half-value time of 0.6 hour.

EXAMPLE 2

Following the same procedure and using the same materials described in Example 1, but increasing the heating time at 95° C. of the aqueous emulsion from 4 hours to 6 hours, a phosphatide product was obtained of a hard water half-value time of 1 hour.

EXAMPLE 3

Following the same procedure and using the same materials described in Example 1, but increasing the heating time at 95° C. of the aqueous emulsion from 4 hours to 8 hours, a phosphatide product was obtained of a hard-water half-value time of 2.6 hours.

The properties of the phosphatides prepared as described in the foregoing Examples 1, 2 and 3 are summarized in Table 1, in which by way of comparison are also included the properties of products obtained by exactly the same procedure but after heating times of the emulsion at 95° C. of 1 and 2 hours respectively.

TABLE 1

| Ex. | Heating time, hours | Acid number | Choline lecithin, percent | Cephalin, percent | Half-value time in hours | |
|---|---|---|---|---|---|---|
| | | | | | Distilled water | Water at 13° H. |
| | 1 | 28.6 | 16.0 | 11.3 | 300 | 0.015 |
| | 2 | 33.5 | 14.3 | 10.2 | 162 | 0.1 |
| 1 | 4 | 38.7 | 12.3 | 8.6 | 10.4 | 0.6 |
| 2 | 6 | 42.7 | 9.6 | 6.9 | 15.6 | 1.0 |
| 3 | 8 | 48.5 | 8.2 | 6.4 | 16.4 | 2.6 |

EXAMPLE 4

200 g. of the lecithin slime used in Example 1, which had a pH value of 6, were stirred with 10 g. acetic anhydride at 20° C. for half an hour, after which only the amino groups of the cephalin had been practically completely acetylated. At the same time the pH value was reduced to 3.5. After the addition of 200 g. water the mixture was heated for 5 hours to 80° C. and then evaporated in a vacuum at 70° C.

The end product had an iodine colour of 20 (after dilution with benzene in the relative proportions 1:9), an acid number of 21 and half-value times of 1.9 hours in distilled water and 3.05 hours in hard water at 13° H.

The crude phosphatide mixture obtained merely by evaporation of the soya slime had in contrast iodine colour 15, acid number 19 and a hard water half-value of less than 0.01 hour.

The iodine colour of the hydrolysate obtained without previous acetylation was 40.

EXAMPLE 5

300 g. soya lecithin slime, which contained 200 g. crude phosphatide mixture, were stirred with 500 g. water to an emulsion (pH value 6.3, acid number 20) and heated with slow stirring for 16 hours to 95° C. After cooling, the greatest part of the water layer was removed by centrifugation and the phosphatide-containing upper layer was evaporated under reduced pressure at below 80° C. until no more loss in weight was observed, to yield an oily residue of a hard water half-value time of 0.7 hour.

EXAMPLE 6

Following exactly the same procedure and using the same materials described in Example 5, but increasing the heating time from 16 hours to 24 hours, a phosphatide was obtained of a hard water half-value time of 9 hours.

EXAMPLE 7

Following exactly the same procedure and using the same materials described in Example 5, but increasing the heating time from 16 hours to 48 hours, a phosphatide was obtained of a hard water half-value time of 3.8 hours.

The properties of the phosphatides prepared as described in Examples 5, 6 and 7 are summarized in Table 2, in which by way of comparison are also included the properties of products obtained by the same procedure as described in Example 5, but after heating of the emulsion for 2.4 and 7 hours.

TABLE 2

| Ex. | Heating time, hours | pH value of the emulsion | Acid number | Half-value time in hours | |
|---|---|---|---|---|---|
| | | | | Distilled water | Water at 13° H. |
| | 2 | 6.3 | 20 | 0.008 | 0.002 |
| | 4 | 6.35 | 20.2 | 0.4 | 0.003 |
| | 7 | 6.22 | 20.7 | 1.2 | 0.005 |
| 5 | 16 | 6.0 | 23.8 | 12.5 | 0.7 |
| 6 | 24 | 5.75 | 27.3 | 15 | 9 |
| 7 | 48 | 5.15 | 38.0 | 2.2 | 3.8 |

EXAMPLE 8

Into 100 g. commercial soya lecithin which contained 65% total phosphatide (acid value 21.9, 17.6% choline lecithin, 12.2% cephalin), and which had been liquefied at 60°, were introduced with intensive stirring 5 g. potassium hydroxide in the form of a 50% aqueous solution (pH value 11.1). The resulting emulsion was further stirred for 60 minutes at the same temperature (60° C.), then diluted with 100 g. water and sufficient 10% lactic acid added to reduce the pH value from 11.1 to 6.0.

The product was next evaporated in a vacuum below 80° C. A viscous liquid lecithin preparation was obtained with the following properties:

Acid number 37.1
7.6% choline lecithin
5.2% cephalin
Half-value time at 50° C. with—

| | Hours |
|---|---|
| Distilled water | 2.4 |
| Water of 13° H. | 3.0 |

EXAMPLE 9

(A) 1785 g. soya lecithin slime with a content of 1000 g. crude phosphatide mixture (acid number 20), were mixed with 2000 ml. water and the pH of the emulsion was adjusted to 4 by addition of a 10% citric acid solution. The emulsion was then heated for 6 hours at 95% C. and afterwards cooled to 20° C. for further treatment.

(B) 400 g. of the hydrolysis mixture were evaporated in a vacuum at 70° C. There resulted 194 g. of a phosphatide mixture with iodine colour 50, acid number 41 and half-value times of 16.5 hours in distilled water and 2.7 hours in water of 13° H.

EXAMPLE 10

A further 400 g. of the hydrolysis mixture prepared as described in part A of Example 9 were extracted twice with 1000 ml. acetone. On evaporation of the purified acetone extracts, 79 g. oil with iodine colour 250 and acid number 49 were produced. The residue from the acetone treatment was evaporated after the addition of 79 g. refined soya oil. There resulted 192 g. of a purified phosphatide mixture with iodine colour 34, acid number 25 and half-value times of 8 hours in distilled water and of 3.1 hours in water of 13° H.

EXAMPLE 11

A further 400 g. of the hydrolysis mixture prepared as described in part A of Example 9 were intensively stirred with 12000 ml. dichloro-ethane. After complete separation of layers, the oil-containing dichloroethane solution was removed and evaporated. By this means 86 g. oil with an iodine colour greater than 1000 and acid number 38 were obtained. After addition of 86 g. refined soya oil to the phosphatides which had not gone into solution, the latter were likewise freed of solvent by vacuum evaporation.

Yield: 193 g. purified phosphatide mixture with the characteristics: iodine colour 26, acid number 26, half-value times 4.8 and 4.4 hours in distilled water and water of 13° H. respectively.

EXAMPLE 12

600 g. of an alcohol-insoluble lecithin fraction (acid number 19.5, 59.9% acetone-insoluble fraction; 15.0% choline lecithin, 14.9% cephalin) obtained from soya lecithin according to the process of French Patent No. 1,403,578 after extraction with 90% alcohol, were stirred with 1800 ml. water and 65% of a 10% citric acid solution to give an emulsion having a pH value of 4.

While being stirred slowly, this emulsion was heated for 7 hours at 95° C. After cooling, the pH was adjusted to 5.5 with diluted potassium carbonate solution and the mixture was evaporated under reduced pressure at 60° C. until it was water-free.

The end product had a content of 7.9% choline lecithin and 7.4% cephalin, an acid number of 33.1 and half-value times of 13.0 hours in distilled water and of 0.4 hour in water of 13° H. respectively.

EXAMPLE 13

175 g. soya lecithin slime with a content of 100 g. crude phosphatide mixture (acid number=20.4) were emulsified at 20° C. with 225 g. water. After addition of 1% of citric acid the mixture which had a pH value of 4.5, was heated with slow stirring for 24 hours at 95° C. After evaporation of the reaction mixture at 80° C. in a vacuum until it was free of water, 100 g. of a phosphatide mixture were obtained (acid number 49; hard water half-value time 3.5 hours).

An air-free margarine was prepared containing 78 parts (by weight) of a fat mixture of melting point 32° C., 5 parts of soured skim milk and 0.2 part of a technical grade stearic acid monodiglyceride per 100 parts of margarine.

As emulsifier for stabilization of the water-in-oil emulsion, 0.025 to 0.4% of the partially hydrolyzed lecithin as prepared above was added to the fatty phase. For comparison a margarine was used prepared according to the same recipe, but containing normal commercial soya lecithin instead of the hydrolyzed phosphatide mixture.

In order to illustrate the emulsifying power of the lecithin preparations both margarines were fried in a pan under standard conditions and the spattering of the margarine was determined according to the method described in "Zeitschrift Fette, Seifen, Anstrichmittel 65, 29 (1963)."

The following results were obtained:

TABLE 3

| Percent added | Anti-spattering action* | |
|---|---|---|
| | Partially hydrolyzed soya lecithin | Normal soya lecithin |
| 0 | 1 | 1 |
| 0.025 | 2 | 1 |
| 0.05 | 6 | 1 |
| 0.1 | 8 | 1 |
| 0.2 | 9 | 1 |
| 0.4 | 9 | 4 |

*1=very heavy spattering.
10=no spattering.

The superior emulsifying action of the partly hydrolyzed phosphatide mixture is clearly demonstrated.

EXAMPLE 14

500 g. rapeseed lecithin slime with a content of 400 g. crude phosphatide mixture (acid number 30), were mixed at 20° C. with 500 g. water until a homogeneous emulsion was obtained. After adjustment of the pH of this emulsion to 4.0 by addition of 20 ml. 10% citric acid solution, it was heated at 95° C. and maintained at this temperature with slow stirring for 17 hours. After removal of the greatest part of the acid layer by centrifugation, the remaining phosphatide mixture was freed of water by evaporation under reduced pressure at 70° C. There resulted 228 g. of a partially hydrolyzed rapeseed lecithin with acid number 50 and half-value times of 24 hours in distilled water and of 2.7 hours in hard water. The half-value times of the unhydrolyzed starting materials under both conditions were less than 0.01 hour.

In order to illustrate the emulsifying power of the lecithin preparations thus obtained air-free milk margarines were prepared by the same procedure described in Example 13, containing from 0.025 to 0.4% of the partially hydrolyzed rapeseed lecithin described above.

For comparison margarines were prepared according to the same recipe, but containing the same proportions of rapeseed lecithin used as starting material in the above-described process. The anti-spattering action was determined according to the method indicated in Example 13.

The following results were obtained:

TABLE 4

| Percent added | Anti-spattering action | |
|---|---|---|
| | Partially hydrolyzed rapeseed lecithin | Normal rapeseed lecithin |
| 0 | 1 | 1 |
| 0.025 | 2 | 1 |
| 0.05 | 3 | 2 |
| 0.1 | 5 | 3 |
| 0.2 | 8 | 3 |
| 0.4 | 8 | 5 |

EXAMPLE 15

500 g. groundnut lecithin slime with a content of 236 g. crude phosphatide mixture (acid number 30.1) were mixed at 20° with 500 g. water until a homogeneous emulsion was obtained. After adjustment of the pH of this emulsion to 4.0 by addition of 22.0 ml. 10% citric acid solution, it was heated at 95° C. and maintained at this temperature for 5 hours with slow stirring. After removal of most of the acid water layer by centrifugation, the remaining phosphatide mixture was freed of water by evaporation under reduced pressure at 70° C.

There resulted 224 g. of a partially hydrolyzed groundnut lecithin with an acid number 53.9 and a content of 90.0% acetone-insoluble material. In order to simplify handling of this product it was diluted with 246 g. groundnut oil and 45 g. of a technical grade monodiglyceride from sunflower oil so that the content of acetone-insoluble material was reduced to 39.2%.

The half-value times of this product (hereinafter defined as Emulsifier A) were 17 hours in distilled water and 5 hours in hard water, respectively, whereas the half-value times of the untreated starting material after dilution with groundnut oil and monodiglycerides in an identical manner (hereinafter defined as Emulsifier B) were 350 hours in distilled water and 1 hour in hard water. The latter value shows that the lecithin used as starting material already contained some hydrolyzed material.

Air-free milk margarines were prepared as described in Example 13, containing as emulsifier from 0.05 to 0.8% by weight of the above-described Emulsifier A. By way of comparison similar margarines were prepared containing the same percentages of the above-described Emulsifier B.

The stability of the margarines on frying under standard conditions, expressed as "antispattering action," is given in Table 5.

TABLE 5

| Percent added | Anti-spattering action | |
|---|---|---|
| | Emulsifier A | Emulsifier B |
| 0 | 1 | 1 |
| 0.05 | 2 | 2 |
| 0.1 | 4 | 2 |
| 0.2 | 6 | 3 |
| 0.4 | 8 | 4 |
| 0.8 | 9 | 4 |

EXAMPLE 16

An artificial calf-milk was prepared by mixing at 40° C. 200 parts by weight of water of 13° hardness, 40 parts by weight of skim milk powder, 9 parts by weight of groundnut fat of melting point 32° C. and 1 part by weight of a partly hydrolyzed soya lecithin prepared as described in Example 8.

What is claimed is:

1. A process for the preparation of phosphatides of improved emulsifying properties in which an aqueous emulsion of an unhydrolysed plant phosphatide selected from the group consisting of soya phosphatide and rapeseed phosphatide at a pH of between 2 and 12 is hydrolysed at between 50° and 100° C. and then separating the phosphatide from the aqueous medium when its hard water half-value time for emulsification of oil is at least 0.2 hour.

2. A process according to claim 1, in which the phosphatide is separated from the aqueous medium when its hard water half-value time is less than 10 hours.

3. A process according to claim 1 in which the phosphatide is separated from the aqueous medium when its hard water half-value time is between 1 and 5 hours.

4. A process according to claim 1 in which the pH of the aqueous medium during hydrolysis is between 3 and 8.

5. A process according to claim 1, in which the aqueous emulsion contains from 0.1 to 3 parts of water by weight of phosphatide.

6. A process according to claim 1, in which the plant phosphatide used is a commercial plant lecithin.

7. A process according to claim 1, in which the plant phosphatide used is a hydrated plant phosphatide as hereinbefore defined.

8. A process according to claim 1, in which the plant phosphatide used is a phosphatide obtained by solvent fractionation of crude phosphatide mixtures.

9. A process according to claim 1, in which the plant phosphatide used is an acylated phosphatide in which the cephalin fractions is present practically completely as acylaminocephalin.

10. A process according to claim 1, in which the plant phosphatide used is a soya phosphatide.

11. A process according to claim 1, in which the aqueous emulsion obtained by the hydrolysis is extracted with 1 to 3 times its volume of an organic solvent selected from the group consisting of lower alkanols having from 1 to 4 carbon atoms, lower ketones having from 1 to 4 carbon atoms, methyl acetate, ethyl acetate, chlorinated hydrocarbons having 1 or 2 carbon atoms and the phosphatide is separated from the extract by centrifugation.

12. A process according to claim 11, in which the phosphatide obtained by the centrifugation is mixed with so much of a purified vegetable glyceride oil that the total phosphatide content of the resulting mixture is essentially the same as the phosphatide content of the mixture before extraction with the organic solvent.

13. A process according to claim 1, in which the pH of the aqueous emulsion obtained by the hydrolysis is adjusted to from 4 to 6.

14. A process according to claim 13, in which the phosphatide is separated from water and other volatiles by evaporation under reduced pressure at below 80° C.

15. A partially hydrolysed phosphatide prepared in accordance with claim 1 wherein said phosphatide has a hard water half-value time of at least 0.2 hour.

References Cited

UNITED STATES PATENTS

| 2,182,767 | 12/1939 | Thurman | 260—403 |
| 2,271,410 | 1/1942 | Thurman | 260—403 |
| 2,272,616 | 2/1942 | Thurman | 260—403 |
| 2,280,427 | 4/1942 | Thurman | 99—123 |
| 2,373,686 | 4/1945 | Julian et al. | 99—15 X |
| 2,604,403 | 7/1952 | Wiechers | 99—55 |
| 3,047,597 | 7/1962 | Pardun | 260—403 |

MAURICE W. GREENSTEIN, Primary Examiner

U.S. Cl. X.R.

99—63, 123; 252—312, 351; 260—403